(12) United States Patent
Stählin et al.

(10) Patent No.: US 10,623,921 B2
(45) Date of Patent: Apr. 14, 2020

(54) COMMUNICATIONS SYSTEM FOR V2X COMMUNICATION (71) Applicant: Continental Teves AG & Co. oHG, Frankfurt (DE)

(72) Inventors: Ulrich Stählin, Oakland Township, MI (US); Marc Menzel, Weimar (DE); Walter Fehrmann, Regensburg (DE)

(73) Assignees: Continental Teves AG & Co. OHG, Frankfurt (DE); Continental Automotive GmbH, Hannover (DE)

( * ) Notice: Subject to any disclaimer, the term of this patent is extended or adjusted under 35 U.S.C. 154(b) by 0 days.

(21) Appl. No.: 15/938,954

(22) Filed: Mar. 28, 2018

(65) Prior Publication Data

US 2018/0220282 A1    Aug. 2, 2018

Related U.S. Application Data

(63) Continuation of application No. PCT/EP2016/072322, filed on Sep. 20, 2016.

(30) Foreign Application Priority Data

Sep. 29, 2015    (DE) .................. 10 2015 218 800

(51) Int. Cl.
*H04W 4/02* (2018.01)
*H04W 4/40* (2018.01)
(Continued)

(52) U.S. Cl.
CPC ............. *H04W 4/40* (2018.02); *H04L 9/3263* (2013.01); *H04L 12/40* (2013.01);
(Continued)

(58) Field of Classification Search
CPC ... H04L 63/0823; H04L 12/40; H04L 9/3263; H04L 2012/40273
See application file for complete search history.

(56) References Cited

U.S. PATENT DOCUMENTS 9,083,581 B1    7/2015 Addepalli et al.
2004/0003252 A1    1/2004 Dabbish et al.
(Continued)

FOREIGN PATENT DOCUMENTS

CN    1722137 A    1/2006
CN    101633358 A    1/2010
(Continued)

OTHER PUBLICATIONS

Trusted Computing Group, Inc., "TCG TPM 2.0 Automotive Thin Profile", Mar. 16, 2015, pp. 1-22 (obtained from https://trustedcomputinggroup.org/wp-content/uploads/TOG-TPM-2.0-Automotive-Thin-Profile_v1.0.pdf on Nov. 21, 2016).

(Continued)

*Primary Examiner* — Lan-Huong Truong (57) ABSTRACT

A communications system for V2X communication, which can be installed in a motor vehicle at an installation location, includes a receiver for receiving communications data and a processor configured to capture a characteristic of the received communications data. The processor also configured to check the arrangement of the communications system at the installation location on the basis of a comparison of the captured characteristic with a reference characteristic.

17 Claims, 4 Drawing Sheets

(51) Int. Cl.
*H04L 29/08* (2006.01)
*H04L 9/32* (2006.01)
*H04L 12/40* (2006.01)
*H04L 29/06* (2006.01)

(52) U.S. Cl.
CPC .......... *H04L 63/0823* (2013.01); *H04L 67/12* (2013.01); *H04L 2012/40273* (2013.01)

(56) References Cited

U.S. PATENT DOCUMENTS

| | | | | |
|---|---|---|---|---|
| 2009/0271112 | A1* | 10/2009 | Basnayake | G01S 5/0072 701/469 |
| 2013/0278769 | A1* | 10/2013 | Nix | H04N 7/18 348/148 |
| 2015/0005981 | A1 | 1/2015 | Grimm et al. | |
| 2015/0025709 | A1* | 1/2015 | Spaulding | G08G 1/163 701/2 |
| 2015/0099533 | A1* | 4/2015 | Menouar | G01S 19/42 455/456.1 |
| 2016/0086491 | A1* | 3/2016 | Choi | G08G 1/205 340/425.5 |
| 2016/0087804 | A1* | 3/2016 | Park | H04L 67/12 713/156 |
| 2016/0119151 | A1* | 4/2016 | Park | H04L 9/006 713/158 |
| 2016/0207530 | A1* | 7/2016 | Stanek | B60W 30/09 |
| 2018/0077668 | A1* | 3/2018 | Chun | H04W 4/046 |

FOREIGN PATENT DOCUMENTS

| | | | |
|---|---|---|---|
| CN | 102035874 | A | 4/2011 |
| CN | 102947870 | A | 2/2013 |
| CN | 103080953 | A | 5/2013 |
| CN | 103731469 | A | 4/2014 |
| DE | 102006015212 | A1 | 10/2009 |
| DE | 102008039925 | A1 | 10/2009 |
| DE | 102009005613 | A1 | 10/2009 |
| DE | 102013200535 | A1 | 7/2014 |
| EP | 2892199 | A1 | 7/2015 |
| WO | WO0182035 | A2 | 10/2009 |
| WO | WO-2014203043 | A1 * | 12/2014 ............ H04W 4/023 |

OTHER PUBLICATIONS

Maxima Raya, et al., "Securing Vehicular Ad Hoc Networks", Journal of Computer Security 15 (2007), IOS Press pp. 39-68.
International Search Report and Written Opinion dated Nov. 29, 2016 from corresponding International Patent Application No. PCT/EP2016/072322.
German Search Report dated Jun. 28, 2015 for corresponding German Patent Application No. 10 2015 218 800.0.
European Examination Report dated Jul. 19, 2019 for corresponding European Patent Application No. 16774467.1.
First Office Action issued by the Patent Office of SIPO of P.R.C. dated Dec. 17, 2019 for the corresponding Chinese Invention Application No. 201680047260.1.

* cited by examiner

COMMUNICATIONS SYSTEM FOR V2X COMMUNICATION

CROSS REFERENCE TO RELATED APPLICATION

This application is a continuation of International application No. PCT/EP2016/072322, filed Sep. 20, 2016, which claims priority to German application No. 10 2015 218 800.0, each of which is hereby incorporated by reference.

TECHNICAL FIELD

The technical field relates generally to vehicle-to-X communication and more particularly to a communications system for vehicle-to-X communication which can be installed in a motor vehicle at an installation location.

BACKGROUND

Vehicle-to-X (V2X) communication, in particular on the basis of the standards IEEE 802.11p or respectively ITS-G5 or IEEE 1609, is the state of the art or respectively advance development and is currently being standardized. In the case of V2X communication it is important that communications systems, in particular V2X antenna systems, only participate in the communication, in particular only transmit if they are participating in the traffic. This can be ensured by means of a Public Key Infrastructure (PKI), wherein only communications systems which are authorized and installed in a permissible manner receive corresponding PKI certificates. Communications systems transmitting without PKI certificates can be separated out by the receiver.

It is additionally important to prevent communications systems being used to transmit incorrect information. The PKI can likewise be used for this purpose, wherein PKI certificates covering a certain period of time can be stored in the communications system. If a communications system is extended with PKI certificates which are still valid from a motor vehicle, or installed at an impermissible installation location, erroneous or non-authorized communications data could be transmitted with this communications system. These communications data could be provided with valid PKI certificates by the communications system and would consequently be identified by the receiver as communications data from a communications system which is installed in a permissible manner. It is difficult to identify such communications systems, which have been extended or installed in a non-permissible manner, and to prevent them being used.

As such, it is desirable to present an efficient and secure concept for V2X communications. In addition, other desirable features and characteristics will become apparent from the subsequent summary and detailed description, and the appended claims, taken in conjunction with the accompanying drawings and this background.

BRIEF SUMMARY

According to a first aspect, a communications system for V2X communication can be installed in a motor vehicle at an installation location. The system includes a receiver for receiving communications data and a processor which is configured to capture a characteristic of the received communications data. The processor is configured to check the arrangement of the communications system at the installation location on the basis of a comparison of the captured characteristic with a reference characteristic. This achieves the technical advantage that the arrangement of the communications system at the installation location can be efficiently checked while the communications system is operating. In this way, an impermissible arrangement, for example an arrangement at an impermissible installation location, or an installation in an external vehicle can be efficiently detected.

The installation location of the communications system can be in or on a roof of the motor vehicle, a windshield or rear window of the motor vehicle, an A, B, or C pillar, a front spoiler, a tailgate, an exterior or interior mirror or a light of the motor vehicle. The installation location of the communications system can additionally be in an engine compartment, a trunk or a passenger compartment, for example in a console in the passenger compartment of the motor vehicle. However, it should be appreciated that other installation locations are possible.

The communications system may include one or a plurality of active or passive antennae which can be configured for V2X communication, for example with additional motor vehicles.

According to one embodiment of the communications system, the characteristic of the received communications data and the reference characteristic are one of the following characteristics: data type, data ID, repetition rate of the communications data, data rate of the communications data, signal strength of the communications data.

According to one embodiment of the communications system, the processor is configured to establish an impermissible arrangement of the communications system if the characteristic of the received communications data differs from the reference characteristic. This achieves the technical advantage that an impermissible arrangement of the communications system can be efficiently detected. The communications data received from the communications system can, for example, originate from the vehicle systems of the motor vehicle and include a clear data ID which can be assigned to the vehicle system, the motor vehicle or a motor vehicle model. If the data ID differs from an expected reference ID, it can be concluded that the communications system is arranged in an impermissible manner in an external vehicle.

According to one embodiment of the communications system, the reference characteristic includes a previously known signal, in particular an airbag signal, and the processor is configured to establish an impermissible arrangement of the communications system if the communications data includes the previously known signal. This achieves the technical advantage that an impermissible arrangement can be efficiently detected. The predetermined signal can be a trigger signal of an airbag and can indicate an accident of the motor vehicle. Since a motor vehicle which has had an accident is generally no longer able to participate in the traffic, it is, for example, no longer authorized to use the communications system for V2X communication. Consequently, the arrangement of the communications system in the motor vehicle can be impermissible.

According to one embodiment of the communications system, the reference characteristic includes an additional previously known signal, in particular a signal of a vehicle system which can only be extended with difficulty, and the processor is configured to establish an impermissible arrangement of the communications system if the communications data do not include the additional previously known signal. This achieves the technical advantage that an impermissible arrangement of the communications system can be efficiently detected. The additional previously known signal can be a control signal of a control unit of the motor vehicle, which can only be extended with difficulty. If the additional previously known signal is not detected by the processor, it can be concluded that the communications system is arranged in an impermissible manner outside the motor vehicle, for example in an external vehicle.

According to one embodiment of the communications system, the received communications data includes position data and the characteristic of the communications data is a distance of the position data from the motor vehicle, in particular from the communications system of the motor vehicle, and the reference characteristic is a reference distance, the processor being configured to establish an impermissible arrangement of the communications system if the difference between the distance and the reference distance exceeds or falls short of a threshold. This achieves the technical advantage that an impermissible arrangement of the communications system can be efficiently detected.

The position data can involve position data of other motor vehicles, in particular of other motor vehicles having a communications system for V2X communication, which can be received by the communications system of the motor vehicle. The position data can include GNSS data. The distance can be the distance between the motor vehicle, in particular between the communications system of the motor vehicle, and another motor vehicle, in particular another communications system of the other motor vehicle. An impermissible arrangement of the communications system, for example on the back of the vehicle instead of on the front of the vehicle, can have an effect on the captured distance. The threshold can be a maximum distance or a minimum distance.

According to one embodiment of the communications system, the processor is configured to produce a digital map on the basis of the position data and to compare the digital map with a reference map, in order to check the arrangement of the communications system at the installation location. This achieves the technical advantage that the arrangement of the communications system can be efficiently checked on the basis of the position data.

According to one embodiment of the communications system, the processor is configured to check the arrangement of the communications system at the installation location cyclically or continually. This achieves the technical advantage that an impermissible arrangement of the communications system can be detected efficiently and independently of the communications system.

According to one embodiment of the communications system, the receiver is a BUS receiver or a V2X receiver. This achieves the technical advantage that the receiver can be connected by means of communications technology to a BUS communications network or a V2X communications network in order to receive communications data.

The communications data may include system data of vehicle systems, in particular control units or sensors, of the motor vehicle, or V2X communications data from other motor vehicles.

According to one embodiment, the communications system includes a V2X transmitter configured to emit the received communications data. This achieves the technical advantage that the received communications data can be efficiently emitted and made available to other receivers, for example other motor vehicles.

According to one embodiment of the communications system, the processor is configured to sign the communications data with a PKI certificate prior to emission provided that the processor does not establish an impermissible arrangement of the communications system, and to not sign the communications data with the PKI certificate prior to emission if the processor establishes an impermissible arrangement of the communications system. This achieves the technical advantage that communications data emitted by a communications system, which is arranged in a permissible manner, can be efficiently authenticated by means of a PKI certificate.

According to one embodiment, the communications system includes a storage device, in which a number of PKI certificates for signing the communications data are stored, and the processor is configured, on establishing an impermissible arrangement of the communications system, to delete the PKI certificates from the storage device. This achieves the technical advantage that the PKI certificates of a communications system, which has been extended or is otherwise arranged in an impermissible manner, can no longer be made available for signing communications data.

According to one embodiment of the communications system, the processor is configured to delete the PKI certificates from the storage device after a certain amount of time has elapsed following the establishment of an impermissible arrangement. This achieves the technical advantage that PKI certificates are not deleted until an impermissible arrangement of the communications system is established. Consequently, this can make it possible to continue using the communications system for a short period, for example until such time as the motor vehicle is inspected in a workshop.

According to one embodiment of the communications system, the processor is configured, on establishing an impermissible installation location of the communications system, to store the communications data. The data can, for example, be stored in the storage device of the communications system or an additional storage device of the motor vehicle. This achieves the technical advantage that, following the detection of the impermissible arrangement of the communications system, it can be understood which communications data caused the detection.

According to one embodiment of the communications system, the V2X transmitter is configured to not emit the communications data if the processor establishes an impermissible arrangement of the communications system. This achieves the technical advantage that an emission of communications data by a communications system, which is installed in an impermissible manner, can be efficiently avoided.

According to one embodiment of the communications system, the V2X transmitter is configured to emit an error message if the processor establishes an impermissible arrangement of the communications system. This achieves the technical advantage that other entities in the V2X communications network can be efficiently informed of the impermissible arrangement of the communications system. The emission of the error message can, for example, result in a certificate revocation of the PKI certificates of the communications system, which is arranged in an impermissible manner, in a PKI system.

According to one embodiment, the communications system includes a number of sensor elements, the number of sensor elements being configured to transfer sensor data to the processor. This achieves the technical advantage that, in addition to the communications data, sensor data for checking the arrangement of the communications system is also available. The number of sensor elements can include at least one temperature sensor element.

According to one embodiment of the communications system, the processor is configured to capture a characteristic of the received sensor data and to compare the captured characteristic of the sensor data with an additional reference characteristic, in order to check the arrangement of the communications system at the installation location. This achieves the technical advantage that the characteristic of the sensor data can be efficiently used to check the arrangement of the communications system. The characteristic of the sensor data and the additional reference characteristic can be temperature profiles.

According to a second aspect, a method for V2X communication utilizing a communications system which can be installed in a motor vehicle at an installation location, includes receiving communications data. The method further includes capturing a characteristic of the received communications data with a processor. The method also includes checking the arrangement of the communications system at the installation location on the basis of a comparison of the captured characteristic with a reference characteristic. This achieves the technical advantage that the arrangement of the communications system at the installation location can be efficiently checked.

The system and/or method can be realized in hardware and/or software.

BRIEF DESCRIPTION OF THE DRAWINGS

Further embodiment examples are explained in greater detail with reference to the appended figures, wherein.

DETAILED DESCRIPTION

Figure 1A:
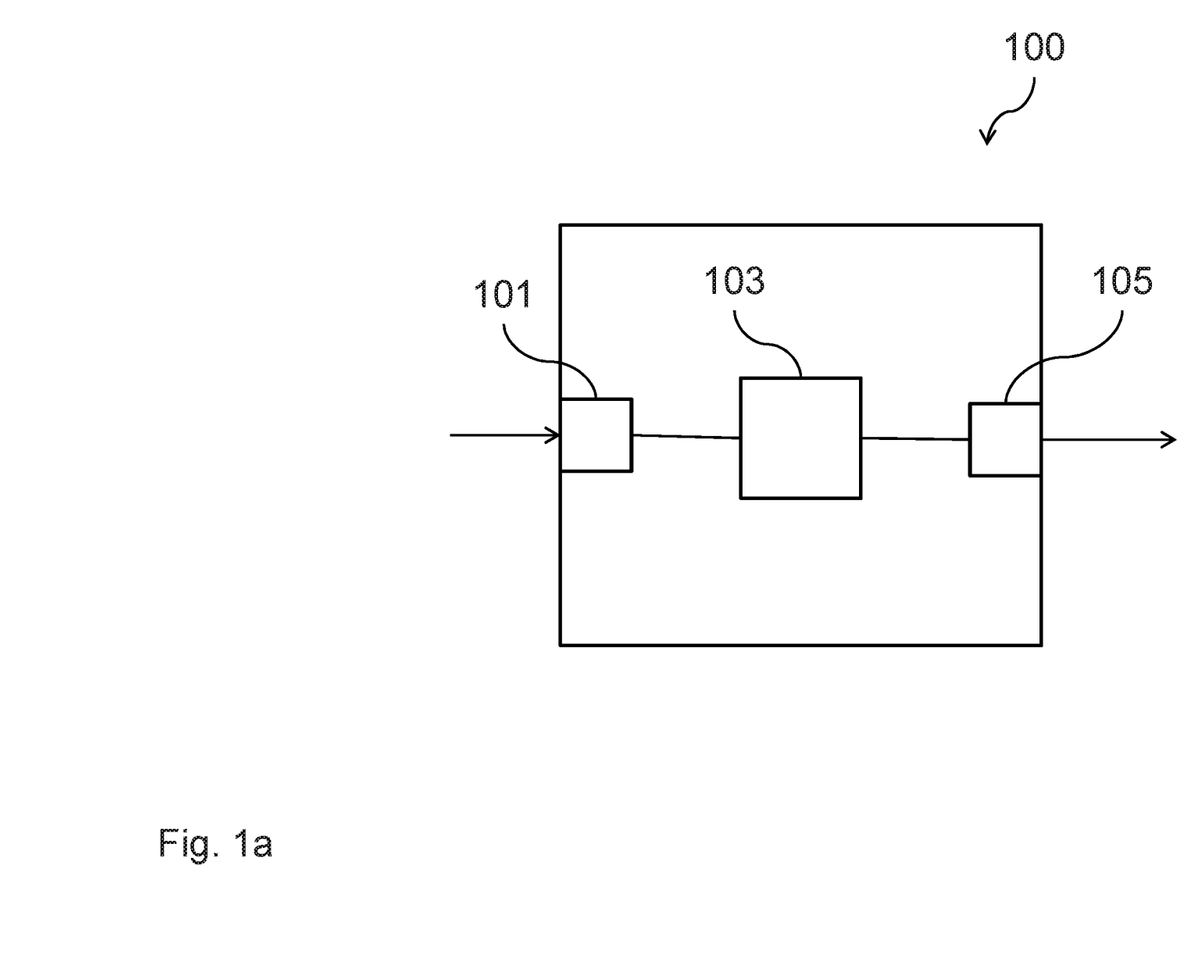
FIG. 1a shows a schematic representation of a communications system according to one exemplary embodiment.

FIG. 1a shows a communications system 100 for V2X communication according to one exemplary embodiment.

The communications system 100 for V2X communication, which can be installed in a motor vehicle at an installation location, includes a receiver 101 for receiving communications data, and a processor 103 which is configured to capture a characteristic of the received communications data and to check the arrangement of the communications system 100 at the installation location on the basis of a comparison of the captured characteristic with a reference characteristic. The communications system 100 in FIG. 1a additionally includes a V2X transmitter 105 in order to emit the communications data.

The installation location of the communications system 100 can be in or on a roof of the motor vehicle, a windshield or rear window of the motor vehicle, an A, B or C pillar, a front spoiler, a tailgate, an exterior or interior mirror or a light of the motor vehicle. The installation location of the communications system 100 can additionally be in an engine compartment, a trunk or a passenger compartment, for example in a console in the passenger compartment of the motor vehicle.

The communications system 100 can include one or a plurality of active or passive antennae which can be configured for V2X communication, for example with additional motor vehicles.

The receiver 101 can be a V2X receiver or a BUS receiver. The receiver 101 can be configured with a BUS communications network or a V2X communications network in order to receive communications data. The communications data can include system data of vehicle systems, in particular control units or sensors, of the motor vehicle, or V2X communications data from other motor vehicles.

According to one embodiment, the characteristic of the received communications data and the reference characteristic are one of the following characteristics: data type, data ID, repetition rate of the communications data, data rate of the communications data, signal strength of the communications data.

The processor 103 can establish an impermissible arrangement of the communications system 100 if the characteristic of the received communications data differs from the reference characteristic. The communications data received by the communications system 100 can, for example, originate from vehicle systems of the motor vehicle and include a clear data ID or respectively message ID which can be assigned to the vehicle system, the motor vehicle or a motor vehicle model. If the data ID differs from an expected reference ID, it can be concluded that the communications system 100 is arranged in an impermissible manner in an external vehicle. If the repetition rate of the communications data differs from the reference repetition rates, it can likewise be concluded that the communications system 100 is arranged in an impermissible manner in an external vehicle. The process can follow the same pattern for the other characteristics.

The processor 103 can additionally be configured to sign the communications data with a PKI certificate prior to emission by means of the V2X transmitter 105 provided that it does not establish an impermissible arrangement of the communications system 100. Additionally, the processor 103 can be configured to not sign the communications data with the PKI certificate if it establishes an impermissible arrangement of the communications system 100.

Figure 1B:
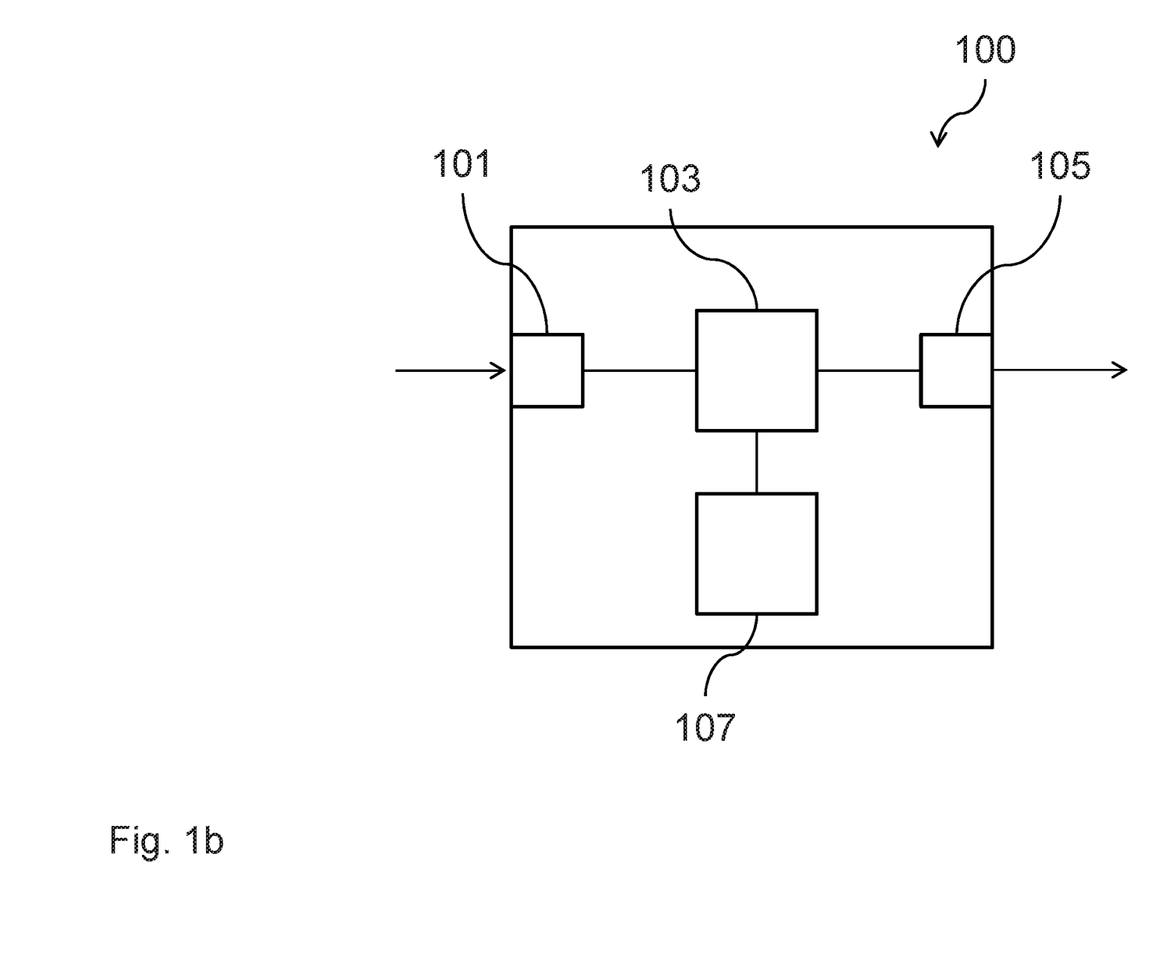
FIG. 1b shows a schematic representation of a communications system according to another exemplary embodiment.

FIG. 1b shows the communications system 100 for V2X communication according to another embodiment. The communications system 100 in FIG. 1b includes a storage device 107.

The storage device 107 can be configured to store the reference characteristic. Additionally, the storage device 107 can be configured to store the PKI certificates in order to sign the communications data.

According to another embodiment, the reference characteristic includes a previously known signal, in particular an airbag signal or respectively a trigger signal of an airbag.

The processor 103 can establish an impermissible arrangement of the communications system 100 if the communications data includes the previously known signal. The airbag signal can indicate that the motor vehicle has had an accident. Since a motor vehicle which has had an accident is generally no longer able to participate in the traffic, it is, for example, no longer authorized to use the communications system 100 for V2X communication. Consequently, the arrangement of the communications system 100 in the motor vehicle can be impermissible.

According to another embodiment of the communications system, the reference characteristic includes an additional previously known signal, in particular a signal of a vehicle system which can only be extended with difficulty or not at all. The vehicle system which can only be extended with difficulty or not at all can be an engine control unit or a combination instrument. The processor 103 establishes an impermissible arrangement of the communications system 100 if the communications data do not include the additional previously known signal.

According to one embodiment of the communications system 100, the processor 103 is configured, on establishing an impermissible arrangement of the communications system 100, to delete the stored PKI certificates. The PKI certificates can be stored in the storage device 107 of the communications system 100 or in an additional storage device of the motor vehicle.

The processor 103 can be configured to delete the PKI certificates after a predefined time, for example eight hours after receiving the airbag signal, so that it is no longer possible to transmit signed communications data.

According to another embodiment, the PKI certificates include pseudonyms and/or long-term certificates (LTC) which can be stored in the storage device 107 of the communications system 100.

According to another embodiment, the processor 103 is configured, on establishing an impermissible installation location of the communications system 100, to store the communications data, the characteristics of which indicate an impermissible arrangement of the communications system 100, in the storage device 107.

According to another embodiment, the processor 103 is configured to prevent the emission of the communications data on establishing an impermissible arrangement of the communications system 100.

According to one embodiment, the V2X transmitter 105 is configured to emit an error message if the processor 103 establishes an impermissible arrangement of the communications system 100. The emission of the error message can, for example, result in a certificate revocation of the PKI certificates of the communications system 100, which is arranged in an impermissible manner, in a PKI system. The error message can be emitted prior to deletion of the PKI certificates from the storage device 107. Likewise, the error message cannot be emitted until after the predefined time, for example eight hours, after the receipt of the airbag signal.

Figure 2:
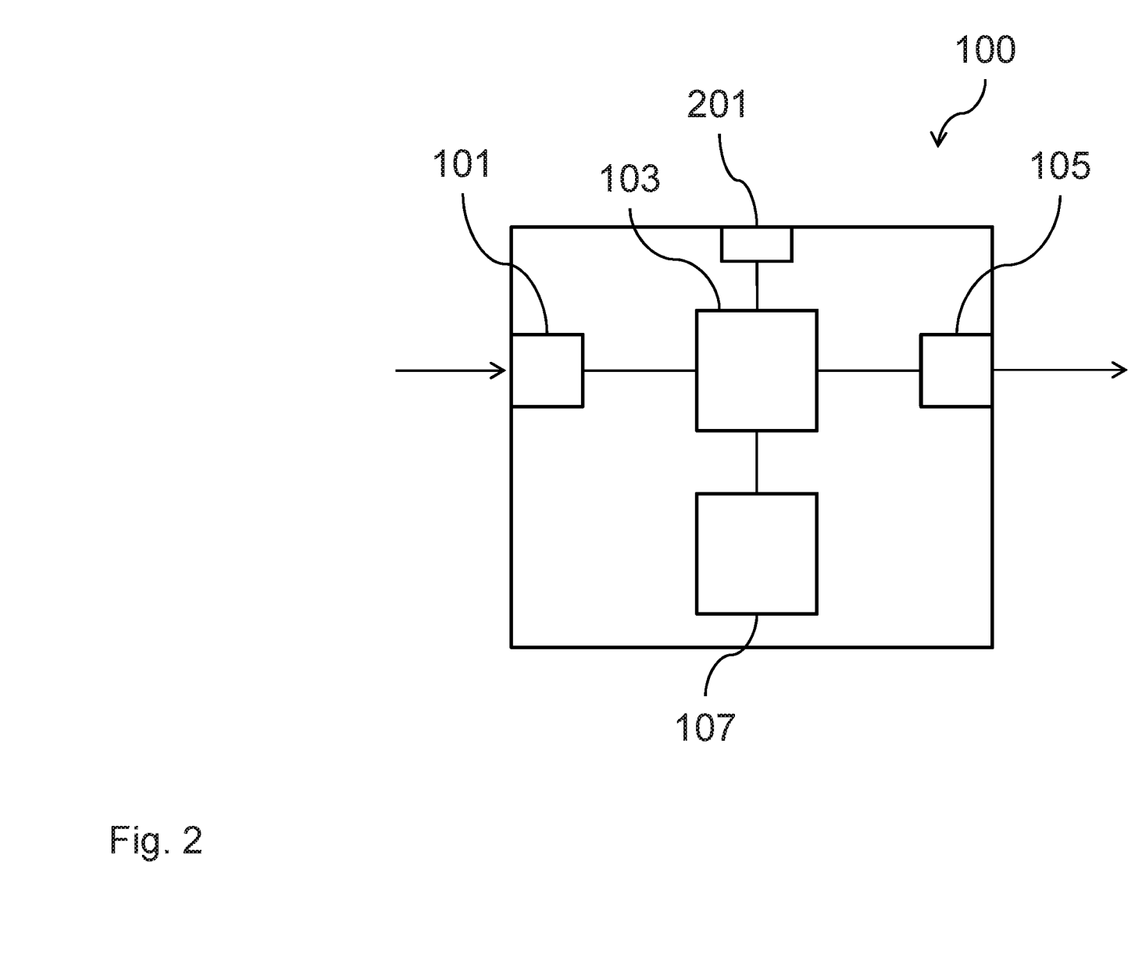
FIG. 2 shows a schematic representation of a communications system having a sensor element according to one exemplary embodiment.

FIG. 2 shows a communications system 100 having a sensor element 201 according to one exemplary embodiment.

The sensor element 201 can be a temperature sensor which forwards sensor data, in particular temperature values, to the processor 103. The processor 103 can be configured to establish a temperature profile on the basis of the temperature values, and to compare the temperature profile with a number of reference temperature profiles, wherein the number of reference temperature profiles can be stored in the storage device 107.

The number of reference temperature profiles can be established during the development and/or manufacture of the communications system 100 and stored in the storage device 207. In this case, reference temperature profiles for different arrangements and/or ambient conditions and/or operating situations of the communications system 100 and/or of the motor vehicle can be established and stored. For example, reference temperature profiles for different times of day, usage periods and/or usage intensity of the communications system 100, speeds of the motor vehicle, weather conditions such as, for example, quantities of rain, or installation locations of the communications system 100 in the motor vehicle, for example on the vehicle roof or in the passenger compartment, can exist. Additionally, reference temperature profiles for a different number of persons in the passenger compartment, different loadings of the motor vehicle, different adjustments of the air conditioning in the motor vehicle or for the presence of devices mounted to or on the motor vehicle, for example roof racks, can exist. The processor 103 can be configured to compare the temperature profile with those reference temperature profiles of the number of reference temperature profiles which fit a current arrangement and/or ambient condition and/or operating situation of the communications system 100 or which are most similar to these.

According to one embodiment, the communications system 100 includes additional sensor elements, in particular additional temperature sensor elements and/or rain sensor elements.

According to another embodiment, the communications system 100 and/or the V2X transmitter 105 include(s) one or a number of active or passive antennae or an antenna system.

According to another embodiment of the communications system 100, the processor 103 is configured to check the arrangement of the communications system 100 at the installation location continually or cyclically, for example in the form of a cyclically performed self-diagnosis of the communications system 100.

According to another embodiment, the processor 103 is configured to produce a digital map on the basis of the characteristics of the received communications data. The processor 103 can be configured to produce the digital map on the basis of a distance and/or of a direction of transmitters of the communications data with respect to the communications system 100 and/or of a signal strength of the communications data. The communications data used during this can, for example, be communications data of other motor vehicles having additional communications systems for V2X communication. The distance and/or the direction can be a distance and/or direction of the communications system 100 of the motor vehicle from the additional communications systems of the other motor vehicles.

The distance and/or the direction of the transmitters can be established on the basis of the received communications data. To this end, the communications data can include position data, in particular GNSS data. The processor 103 can be configured to compare the position data of the received communications data with its own position data, in order to establish the distance and the direction. The distance can be a distance between the motor vehicle, in particular between the communications system 100 of the motor vehicle and another motor vehicle or respectively another communications system of the other motor vehicle.

The communications system 100 can include a position sensor, in particular a GNSS sensor, or be connected by communications technology to a position sensor of the motor vehicle, in order to capture its own position data.

The digital map can also be built up on the basis of reception field strengths or respectively include these, in addition to the position information. In addition, the reception direction can be used, which can be particularly advantageously employed when using two antennae having the so-called diversity modes.

The processor 103 can be configured to reproduce the digital map after each restart of the communications system 100 or of the motor vehicle. Additionally, the processor 103 can be configured to compare the digital map continually with a reference map created during the development. If the deviations between the reference map and the digital map exceed a threshold, it can be concluded that the communications system 100 is arranged in an impermissible manner.

According to one embodiment, the reference map is stored in the storage device 107. Additionally, additional reference maps can exist for different installation locations of the communications system 100, for example roof racks, trailers or additional side windows. The additional reference maps can likewise be stored in the storage device 107.

Figure 3:
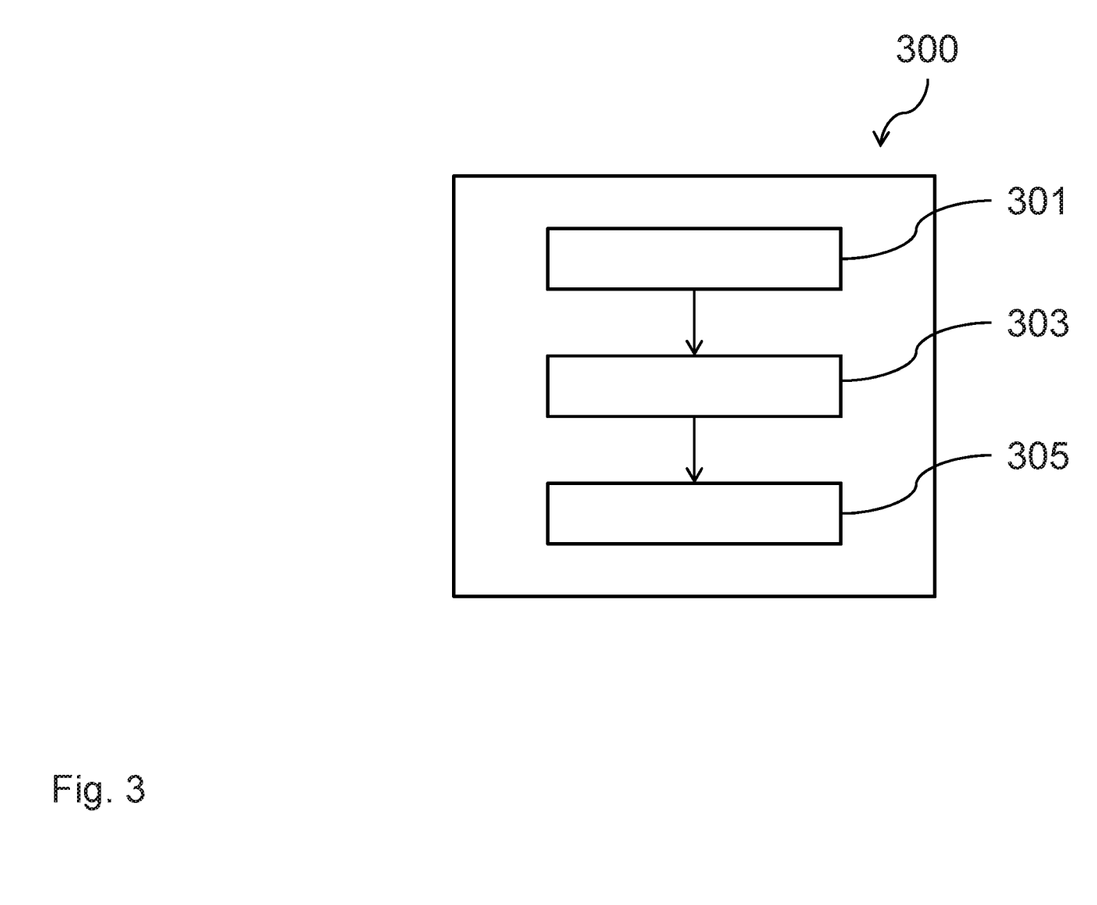
FIG. 3 shows a diagram of a method for V2X communication having a communications system according to one exemplary embodiment.

FIG. 3 shows a diagram of a method 300 for V2X communication according to one embodiment.

The method 300 for V2X communication with the communications system 100, which can be installed in the motor vehicle at the installation location, includes receiving 301 the communications data, capturing 303 the characteristic of the received communications data with the processor 103, and checking 305 the arrangement of the communications system 100 at the installation location on the basis of a comparison of the captured characteristic with a reference characteristic.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A communications system for Vehicle-to-X (V2X) communication installed in a motor vehicle at an installation location, the communications system comprising:
    a receiver for receiving communications data;
    a processor configured to:
        capture a characteristic of the received communications data, and
        check the arrangement of the communications system at the installation location on the basis of a comparison of the captured characteristic with a reference characteristic; and
    a V2X transmitter configured to emit the received communications data.

2. The communications system according to claim 1, wherein the characteristic of the received communications data and the reference characteristic being at least one of the following: data type, data identification (ID), repetition rate of the communications data, data rate of the communications data, and signal strength of the communications data.

3. The communications system according to claim 1, wherein the processor is further configured to establish an impermissible arrangement of the communications system if the characteristic of the received communications data differs from the reference characteristic.

4. The communications system according to claim 1, wherein the reference characteristic comprises a previously known signal, and the processor is configured to establish an impermissible arrangement of the communications system if the communications data comprises the previously known signal.

5. The communications system according to claim 4, wherein the previously known signal is an airbag signal.

6. The communications system according to claim 4, wherein the previously known signal is a signal of a vehicle system which can only be extended with difficulty.

7. The communications system according to claim 1, wherein the received communications data comprises position data, the characteristic of the communications data is a distance of the position data from the communication system of the motor vehicle, and the reference characteristic being a reference distance, the processor further configured to establish an impermissible arrangement of the communications system if the difference between the distance and the reference distance exceeds or falls short of a threshold.

8. The communications system according to claim 1, the processor further configured to check the arrangement of the communications system at the installation location cyclically or continually.

9. The communications system according to claim 1, the receiver comprising at least one of a bus receiver and a V2X receiver.

10. The communications system according to claim 9, the processor further configured to sign the communications data with a Public Key Infrastructure (PKI) certificate prior to emission provided that the processor does not establish an impermissible arrangement of the communications system, and to not sign the communications data with the PKI certificate prior to emission if the processor establishes an impermissible arrangement of the communications system.

11. The communications system according to claim 10, further comprising a storage device in which a number of PKI certificates for signing the communications data are stored, and wherein the processor is further configured, to delete the PKI certificates from the storage device on establishing an impermissible arrangement of the communications system.

12. The communications system according to claim 11, the processor further configured to delete the PKI certificates from the storage device after a certain amount of time has elapsed following the establishment of an impermissible arrangement.

13. The communications system according to claim 1, the V2X transmitter further configured to not emit the communications data if the processor establishes an impermissible arrangement of the communications system.

14. The communications system according to claim 1, the V2X transmitter further configured to emit an error message if the processor establishes an impermissible arrangement of the communications system.

15. The communications system according to claim 1, further comprising at least one sensor element configured to transfer sensor data to the processor.

16. The communications system according to claim 15, the processor further configured to capture a characteristic of the received sensor data and to compare the captured characteristic of the received sensor data with an additional reference characteristic, in order to check the arrangement of the communications system at the installation location.

17. A method for Vehicle-to-X (V2X) communication, having a communications system which can be installed in a motor vehicle at an installation location, the method comprising:
    receiving communications data;
    capturing a characteristic of the received communications data with a processor; and
    checking the arrangement of the communications system at the installation location on the basis of a comparison of the captured characteristic with a reference characteristic, the communications system comprising a V2X transmitter which is configured to emit the received communications data.

* * * * *